United States Patent
Truong (10) Patent No.: US 6,230,987 B1
(45) Date of Patent: May 15, 2001

(54) APPLICATORS FOR ALLOWING A PREDETERMINED FLUID FLOW FOR DISSOLVING AND DISTRIBUTING SOLUBLE SUBSTANCES

(76) Inventor: Hai Quang Truong, 22 Belcanto, Mission Viejo, CA (US) 92692

( * ) Notice: Subject to any disclaimer, the term of this patent is extended or adjusted under 35 U.S.C. 154(b) by 0 days.

(21) Appl. No.: 09/576,975
(22) Filed: May 23, 2000
(51) Int. Cl.$^7$ ...................................... A62C 5/02
(52) U.S. Cl. .................. 239/310; 239/317; 239/379; 137/268
(58) Field of Search ................... 239/310, 313, 239/314, 316, 317, 379; 137/268

(56) References Cited

U.S. PATENT DOCUMENTS

| | | | |
|---|---|---|---|
| 1,734,164 | * 11/1929 | Faber ..................... | 239/310 |
| 1,769,428 | * 7/1930 | Gatchet ................... | 239/317 |
| 3,421,738 | * 1/1969 | Dulger .................... | 239/317 |
| 3,833,177 | * 9/1974 | Pasley et al. . | |
| 3,901,262 | * 8/1975 | Gutkowski ............... | 239/310 |
| 4,331,174 | * 5/1982 | King, Sr. ................. | 137/268 |
| 4,385,034 | * 5/1983 | Gacer . | |
| 4,662,387 | * 5/1987 | King, Sr. ................. | 137/268 |
| 4,873,727 | * 10/1989 | Homan ................... | 239/310 |
| 5,199,645 | * 4/1993 | Anderson et al. . | |
| 5,915,622 | * 6/1999 | Foote ..................... | 239/317 |

* cited by examiner

*Primary Examiner*—David A. Scherbel
*Assistant Examiner*—Dinh Q. Nguyen (57) ABSTRACT

An applicator for allowing a predetermined flow of a fluid for dissolving and distributing soluble substances comprises of a cap and a hollow cylindrical housing. The hollow cylindrical housing comprises of an enlarged chamber having a narrowed inlet port at its lower end. The narrowed inlet port has external threads connecting to a Tee pipe fitting of a pipeline of a fluid system and has a cylindrical flow channel extending to the enlarged chamber. The cylindrical flow channel has six equal V flow passages which are constructed by six vertical dividing walls locating at equal spaces around the wall of the cylindrical flow channel and extending inward to the axis of the cylindrical flow channel. The six equal V flow passages have six equal vertical openings which are constructed by the vertical dividing walls and disposed outside the cylindrical flow channel of the narrowed inlet port at a predetermined length. The six equal vertical openings comprises of three vertical inlets and three vertical outlets. The six equal vertical openings have a same bottom wall which is constructed at the lower end of the vertical dividing walls. The same bottom wall has a diameter smaller than the minor diameter of the external threads of the narrowed inlet port.

7 Claims, 7 Drawing Sheets

APPLICATORS FOR ALLOWING A PREDETERMINED FLUID FLOW FOR DISSOLVING AND DISTRIBUTING SOLUBLE SUBSTANCES

BACKGROUND—FIELD OF THE INVENTION

This invention relates generally to applicators for allowing a predetermined flow of a fluid for dissolving soluble substances and distributing mixtures to the fluid. The mixtures are formed inside the applicators by mixing the fluid with the soluble substances. The soluble substances can be in types of solid, solution or fluid. The most advantageous fields for using this invention are water sprinkler systems that provide nutrients for lawns, gardens or vegetable fields. Said applicators can be installed to existing Tee pipe fittings of pipelines of water sprinkler systems. The nutrients such as fertilizers, insecticides, or chemical compounds are placed inside the applicators. Their mixtures will be diluted into downstream flows of water in the Tee pipe fittings. It is to be understood that the scope of the invention is not limited to these fields presented hereinafter.

DESCRIPTION OF PRIOR ARTS

The following U.S patents have the most pertinent prior arts: Pasley, U.S. Pat. No. 3,833,177, Gacer, U.S. Pat. No. 4,385,034, and Anderson, U.S. Pat. No. 5,199,645. These prior art devices are well known in lawn sprinkler systems for automatically dissolving and distributing fertilizers or the likes to sprinkler heads. Mr. Pasley shows a water disseminating device which is connected to a Tee pipe fitting of a water system. The device has a control valve for adjusting water flow in the Tee pipe fitting into and out of a pair of dissimilar passages which are individually interconnected to his container and the water system. Mr. Gacer shows a base having a flow channel and a chamber secured to the base. Along the flow channel there is an inlet port having a dome member. The dome member has diffusers for diffusing water into the chamber. An outlet port is extended between the flow channel and the chamber for dispensing the resulting mixture to a downstream flow of water in the flow channel. Flow out of the resulting mixtures formed inside Pasley's and Gacer's devices is extremely restricted because their outlet ports are disposed flat to their flow channels. That will cause unpredictable amounts of the resulting mixtures for distribution to their water systems.

Mr. Anderson shows a housing with a removable canister. The removable canister has a plurality of regularly spaced elongated slots to allow water passage in and out of the interior portion of the canister. The water mixes with and dissolves chemical compounds and continues out of the other slots. His device has the same problem as Pasley's and Gacer's devices. That is unpredictable amounts of a resulting mixture for distribution to his water system. The above problem is solved by the new invention. The invention can precisely provide predetermined amounts of resulting mixtures to any flowing fluid system. Furthermore, the invention can precisely provide predetermined amounts of fluids in its applicator for dissolving the chemical compounds. None of the above prior arts taken in combination anticipates or makes obvious the invention claimed herein.

BACKGROUND OF THE INVENTION

There are two main problems encountered in conjunction with the above prior art devices. First, unpredictable amounts of water for dissolving chemical compounds. Second, unpredictable amounts of resulting mixtures for distribution to water sprinkler systems. That will cause detrimental effects for lawns or vegetable fields. The invention will solve these two problems. The invention is an applicator connected to a Tee pipe fitting of a water sprinkler system. Each applicator has a total predetermined inlet area and a total predetermined outlet area for the water in and out of said applicator, respectively. The total predetermined inlet area is equal to a predetermined percent of a cross-sectional flow area of the horizontal flow channel of the Tee pipe fitting. The total predetermined outlet area is equal to a predetermined percent of the cross-sectional flow area of the horizontal flow channel of the Tee pipe fitting. The total predetermined inlet area can be different with the total predetermined outlet area.

Furthermore, some above prior art devices require maintenance and space for storage. Some of them are complicated in structure, expensive to build, and inconvenient to install to existing pipe fittings of sprinkler systems. The present invention helps the user solve those problems by installing it directly to any existing Tee pipe fitting of the sprinkler systems. It will be flush with a ground surface like pop-up sprinklers. It can be installed at strategically spaced positions of preexisting pop-up sprinklers and will allow the water to mix with and dissolve fertilizers or the likes. The invention can apply to any type or form of any soluble substance.

OBJECTS AND ADVANTAGES OF THE INVENTION

Accordingly, I claim the following as my objects and advantages of the invention: to provide an applicator which permits precisely a predetermined flow of water into the applicator for dissolving soluble substances; to provide an applicator which distributes precisely a predetermined flow of a resulting mixture into pipelines of water sprinkler systems; to provide such an applicator will save time and labor for dissolving and distribution of fertilizers or the likes over large or small ground areas; to provide an applicator which is simple and has no moving internal parts; to provide an applicator which requires no maintenance at all; to provide an applicator which is low cost and easy to install to any existing position of pop-up sprinklers; to provide an applicator which can be installed flush with the ground. Further objectives and advantages of the invention will become apparent from a consideration of the ensuing description and the accompanying drawings.

DRAWING REFERENCE NUMERALS 20 cap
21 sealing gasket
22 hollow cylindrical housing
23 half domes of 20
24 enlarged chamber of 22
25 narrowed inlet port of 22
26 tapered transition section of 22
27 cylindrical flow channel of 25
28 external threads of 25
29 vertical dividing walls of 25
30 V flow passages of 25
31 Tee pipe fitting
32 bottom wall of 25
33 bottom wall of 34
34 vertical openings of 30
35 thin flatted screen filters of 30
36 curved surfaces of 34
37 direction of water flow of 31
38 flat surfaces
39 flat surfaces
40 other hollow cylindrical housing
41 hollow cylindrical screen filter of 40
42 other hollow cylindrical housing
43 cylindrical flow control wall of 42
44 plurality of openings of 43
45 bottom wall of 43

DESCRIPTION OF THE PREFERRED EMBODIMENT

Figure 1:
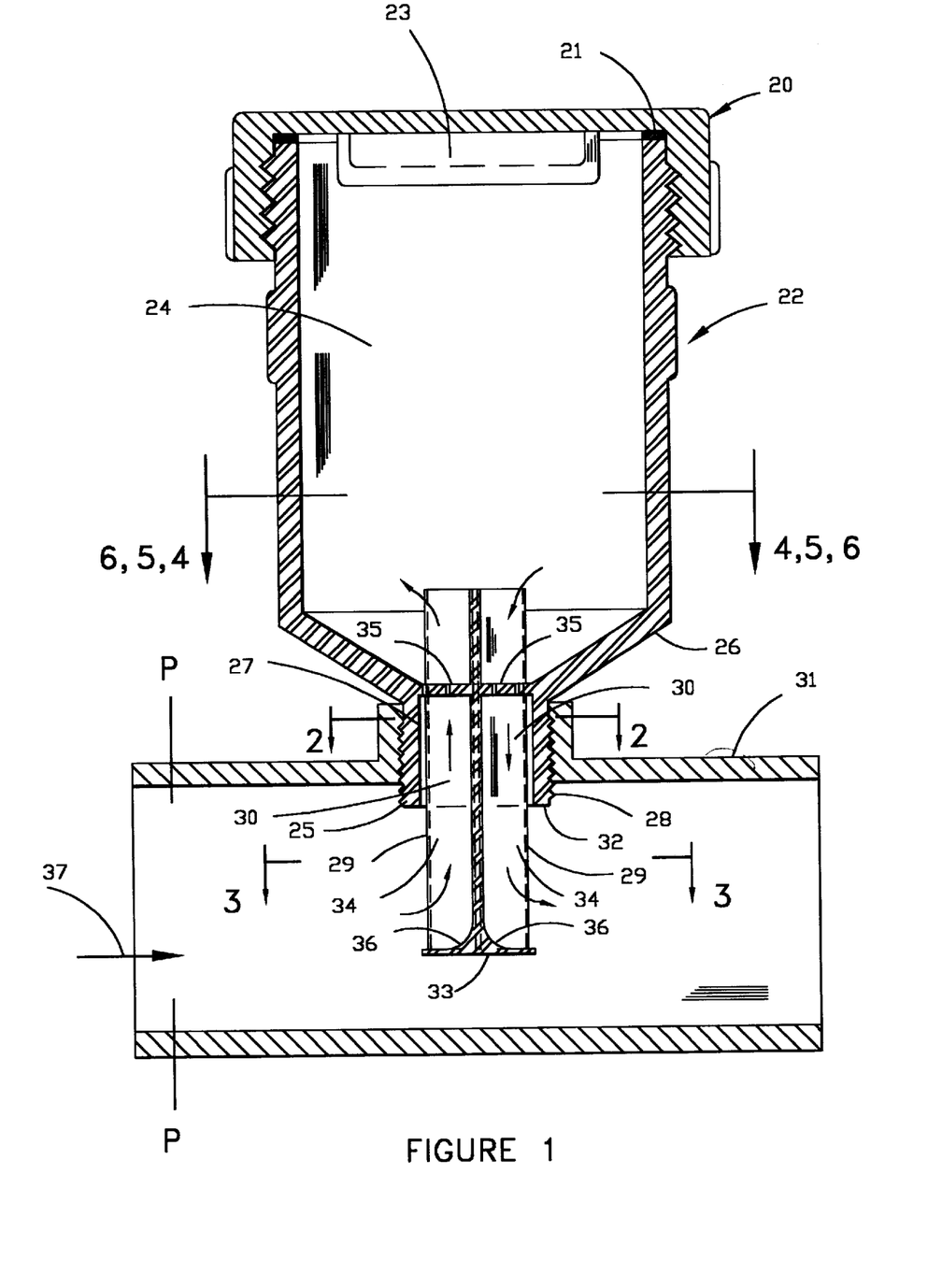
FIG. 1 shows a longitudinal, sectional view of an applicator according to the invention and attached to a Tee pipe fitting 31 of a water sprinkler system.
Figure 2:
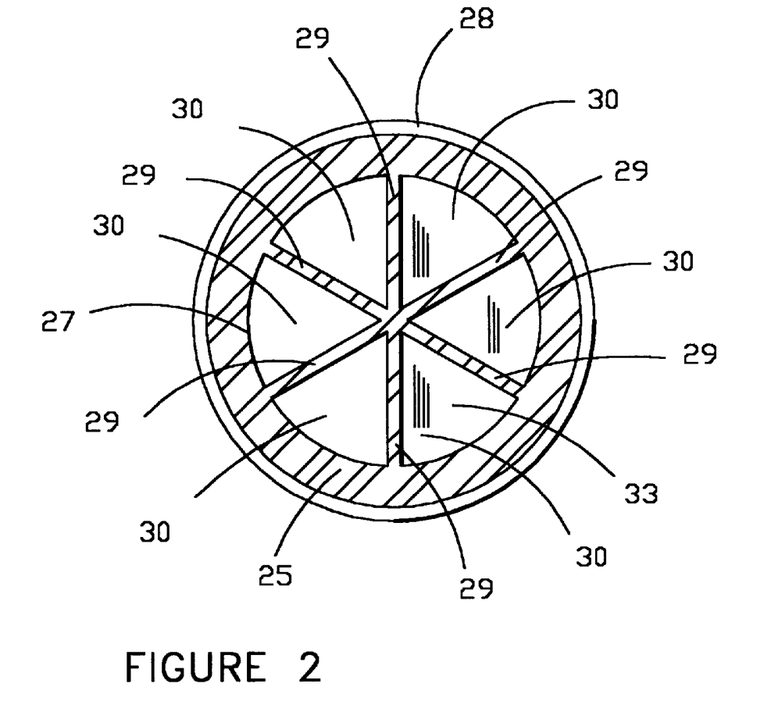
FIG. 2 shows a cross-sectional view of a narrowed inlet port 25 taken through the line 2—2 of FIG. 1.
Figure 4:
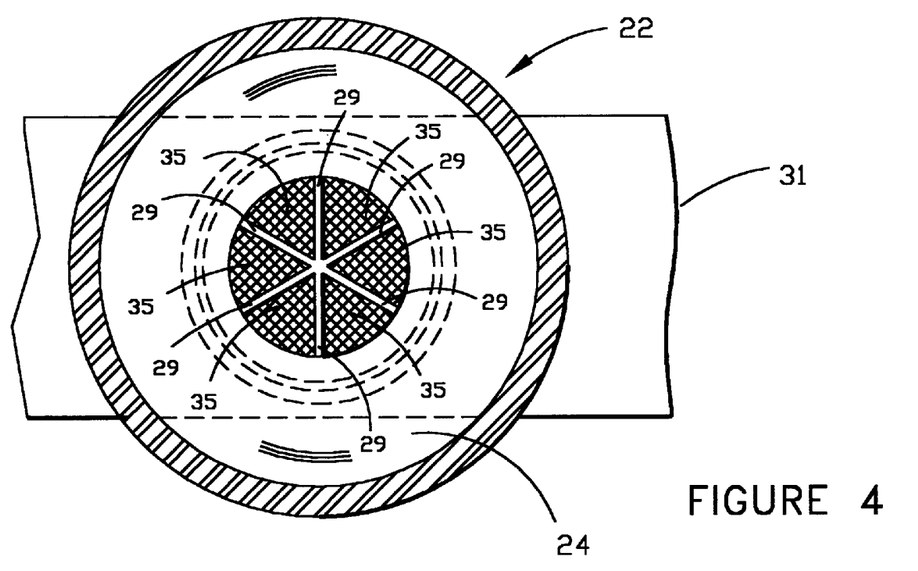
FIG. 4 shows a cross-sectional view of an enlarged chamber 24 taken through the line 4—4 of FIG. 1.

FIG. 1 shows an applicator according to the preferred embodiment of the invention. The applicator, herein illustrated, comprises of a cap 20, a sealing gasket 21, and a hollow cylindrical housing 22. The cap 20 is preferably made of plastic or suitable materials, has two separate half domes 23 recessed on its top, and is provided with internal threads at its open end. The hollow cylindrical housing 22, which is preferably made of plastic or suitable materials, comprises of an enlarged chamber 24 connecting to a narrowed inlet port 25 by a tapered transition section 26. The enlarged chamber is provided with external threads at its upper end for engaging with the internal threads of the cap 20. The narrowed inlet port has a cylindrical flow channel 27 extending to the enlarged chamber and has external threads 28 for connecting to a Tee pipe fitting 31 of a water sprinkler system. Inside the cylindrical flow channel there are six vertical dividing walls 29 which are constructed by part of the housing wall, located at equally spaced positions around the wall of the cylindrical flow channel and extending inward to the center of the cylindrical flow channel to form six equal V flow passages 30 as shown clearly in FIG. 2. The six vertical dividing walls 29 have their upper ends extending upward within the enlarged chamber 24 and their lower ends extending downward to a predetermined length measured from the bottom wall 32 of the narrowed inlet port 25. A bottom wall 33, which has a diameter lying within a projected boundary of the minor diameter of the external threads 28 of the narrowed inlet port 25, is constructed at the lower end of the six vertical dividing walls 29 to form six equal vertical openings 34 for the water in the Tee pipe fitting to flow in and out of the hollow cylindrical housing. Each V flow passage 30 has a thin flatted screen filter 35 which is formed by part of the housing wall extending inward from the wall of the cylindrical flow channel to the vertical dividing walls 29 as shown clearly in FIG. 4. Curved surfaces 36 are formed from top surfaces of the bottom wall 33 to lower center corners of the six vertical dividing walls.

Figure 3:
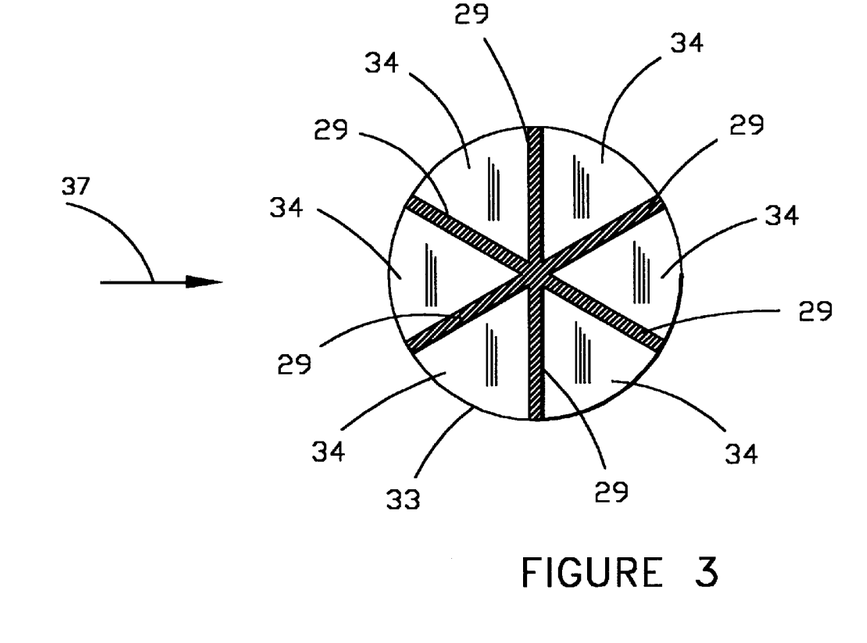
FIG. 3 shows a cross-sectional view of vertical dividing walls 29 taken through the line 3—3 of FIG. 1.

FIGS. 1 and 3 show the six equal vertical openings 34 which consist of three vertical inlets 34 faced directly to a direction of water flow as indicated by an arrow 37 and three vertical outlets 34 faced opposite to the direction of the water flow. A total vertical flow area of the three vertical inlets or outlets 34 is equal to a predetermined percent of a cross-sectional flow area of the horizontal flow channel of the Tee pipe fitting. The cross-sectional flow area of the horizontal flow channel is measured in a plane taken from the line P—P transverse to the horizontal axis of the Tee pipe fitting as shown in FIG. 1. Each vertical flow area of the six equal vertical openings 34 is measured at outermost edges of the vertical dividing walls 29 as shown clearly in FIG. 3.

Description of the Invention Operation

As described in the description of the preferred embodiment and shown in FIG. 1, the inventing applicator is installed directly to the Tee pipe fitting 31. The six equal vertical openings 34 are totally disposed in the horizontal flow channel of the Tee-pipe-fitting. When an user turns on his sprinkler system, the inventing applicator will precisely allow a predetermined portion of water in the horizontal flow channel of the Tee pipe fitting into the three vertical inlets 34 through their V flow passages 30 to the enlarged chamber 24 for mixing with and dissolving soluble substances at a predetermined flow ratio. A mixture, which is formed inside the enlarged chamber, flows through the other three V flow passages 30 of the three vertical outlets 34 and is diluted in a downstream flow of water in the horizontal flow channel of the Tee pipe fitting at a predetermined flow ratio. For more effective distribution of the soluble substances to any large areas of lawns, gardens, golf courses, vegetable fields, agricultural fields etc., the user may install the inventing applicators at equal distances along their sprinkler pipelines. This invention helps the user save time, labor and cost for dissolving and distributing the soluble substances into their sprinkler systems.

Description of Other Embodiments

The user can use other embodiments of the invention for dissolving the soluble substances and distributing precisely desired amounts of the mixtures as described in the description of the preferred embodiment and shown in FIG. 1.

Figure 5:
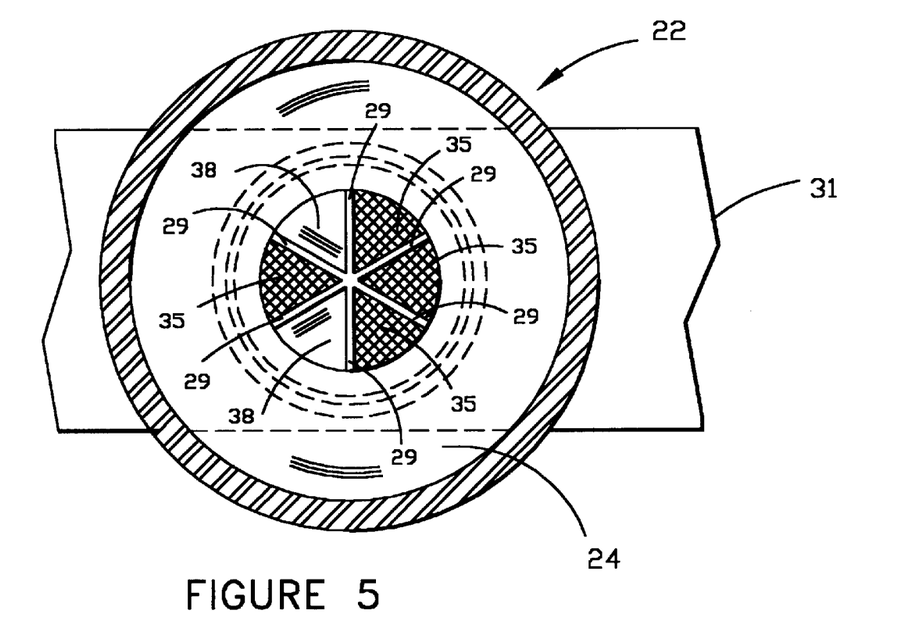
FIG. 5 shows a cross-sectional view of another embodiment taken through the line 5—5 of FIG. 1.

Another housing of the invention is identical in structure and shape to the hollow cylindrical housing 22 as described in the description of the preferred embodiment and shown in FIG. 1 with the exception of two flat surfaces 38 as indicated in FIG. 5. The FIG. 5 taken from the lines 5—5 of the FIG. 1 shows that two of the three inlet V flow passages 30 are covered by the two flat surfaces 38 which are located apart. So this housing has a total inlet area smaller than its total outlet area.

Figure 6:
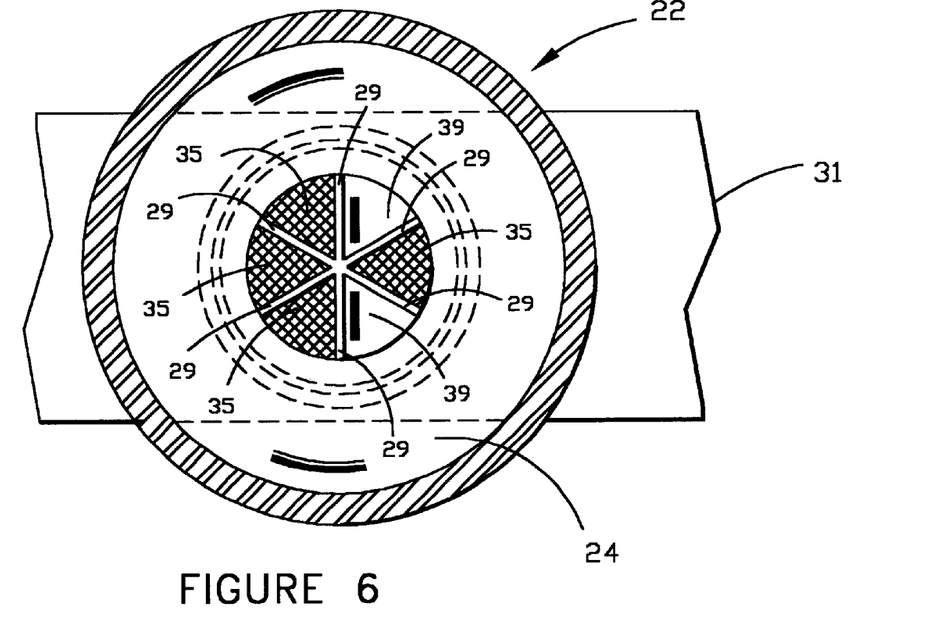
FIG. 6 shows a cross-sectional view of another embodiment taken through the line 6—6 of FIG. 1.

Another housing of the invention is identical in structure and shape to the hollow cylindrical housing 22 as described in the description of the preferred embodiment and shown in FIG. 1 with the exception of two flat surfaces 39 as indicated in FIG. 6. The FIG. 6 taken from the lines 6—6 of the FIG. 1 shows that two of the three outlet V flow passages 30 are covered by the two flat surfaces 39 which are located apart. So this housing has a total inlet area greater than its total outlet area.

Figure 7:
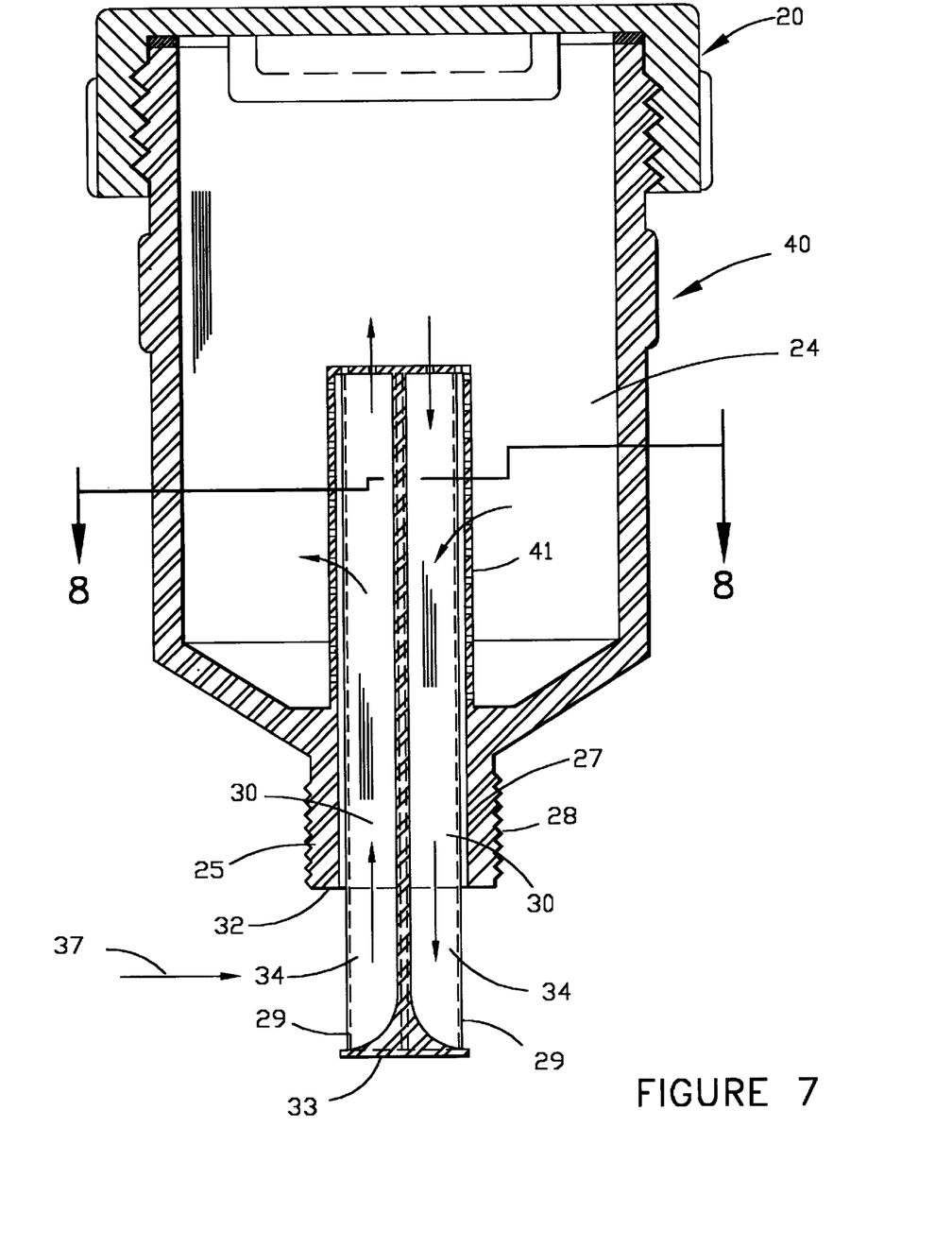
FIG. 7 shows a longitudinal, sectional view of another embodiment 40 of the invention.
Figure 8:
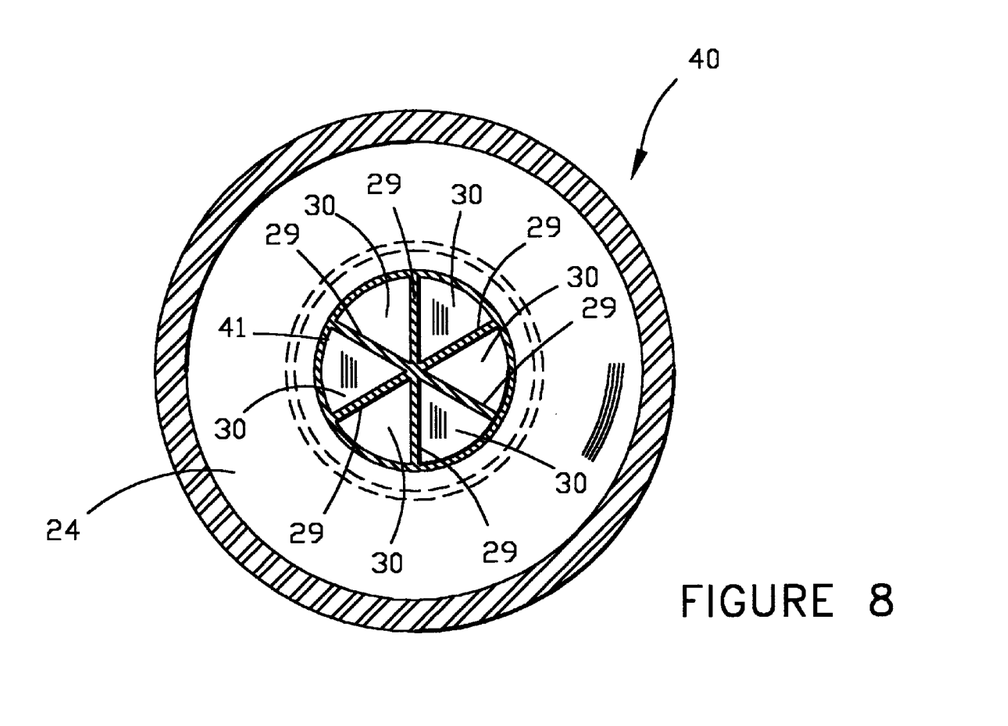
FIG. 8 shows a cross-sectional view of a hollow cylindrical screen filter 41 taken through the line 8—8 of FIG. 7.

FIG. 7 shows another housing 40 of the invention which is identical in structure and shape to the hollow cylindrical housing 22 as described in the description of the preferred embodiment and shown in FIG. 1 with the exception of its hollow cylindrical screen filter 41. The hollow cylindrical screen filter 41 is formed by part of the housing wall, constructed around the inner perimeter of the cylindrical flow channel 27 of the inlet port 25, elongated deeply within the enlarged chamber 24, and extended inward to form a top wall of the hollow cylindrical screen filter 41. Upper ends of the vertical dividing walls 29 are extending upward to the top wall of the hollow cylindrical screen filter 41. And all narrowed sides of the vertical dividing walls 29, which are extended inside the hollow cylindrical screen filter, are extending outward to the inner surface of the hollow cylindrical screen filter 41 as shown clearly in FIG. 8. Now the six equal V flow passages 30 in this housing 40 are extended from the bottom wall 32 to the top wall of the hollow cylindrical screen filter. The hollow cylindrical screen filter 41 will help the water mix strongly with the soluble substances placed inside the enlarged chamber 24.

Figure 9:
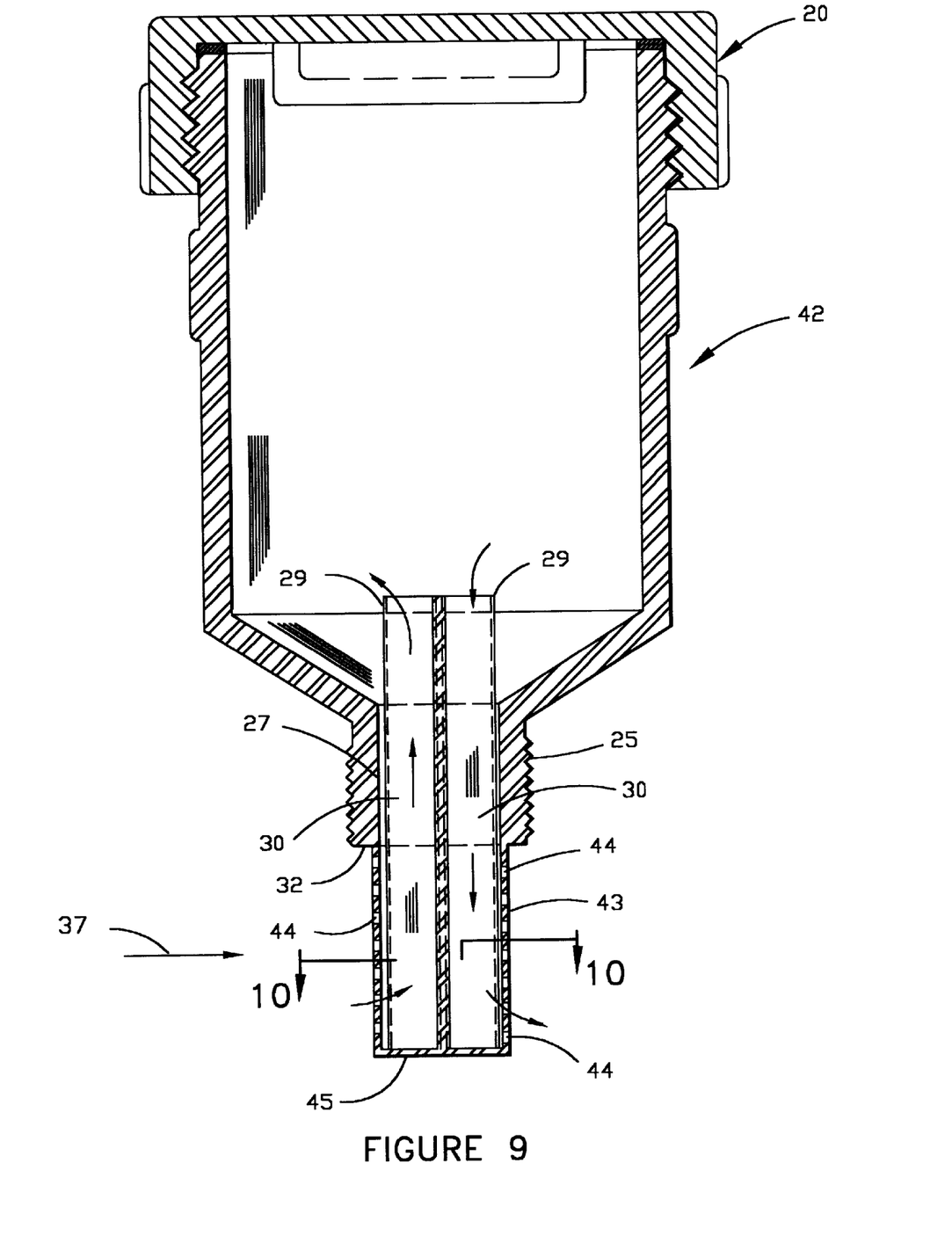
FIG. 9 shows a longitudinal, sectional view of another embodiment 42 of the invention.
Figure 10:
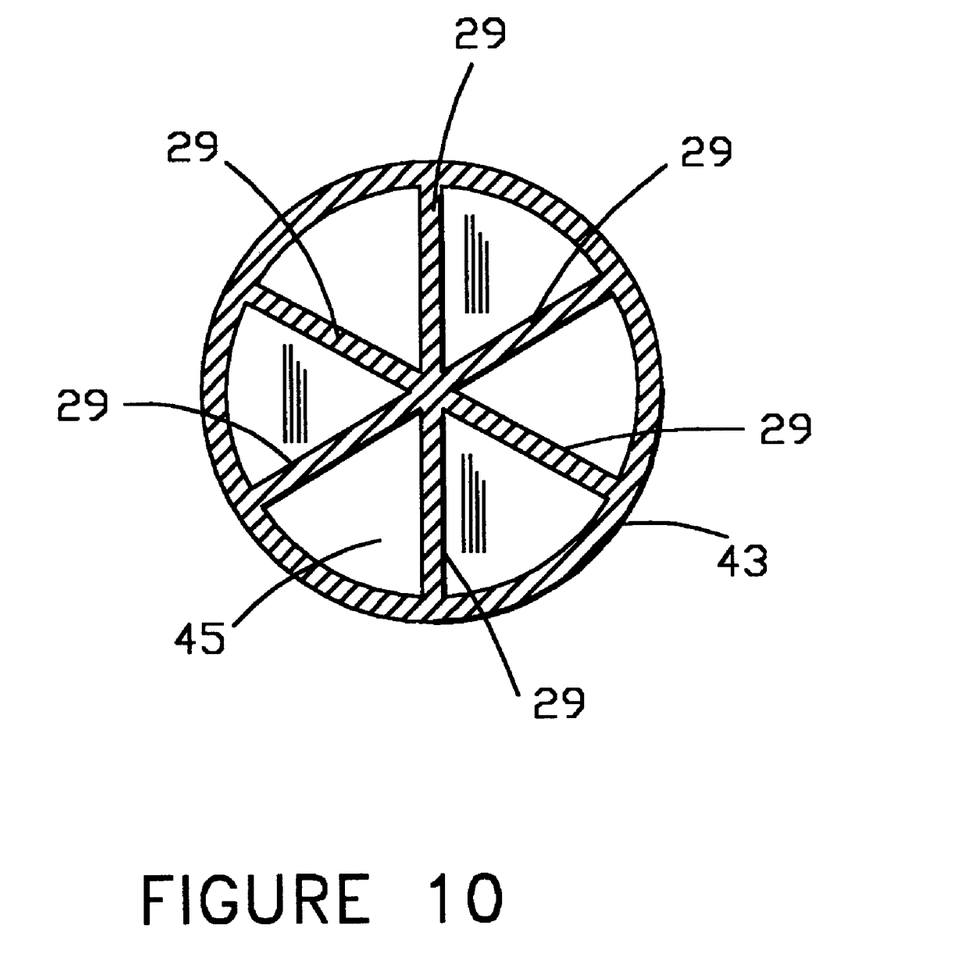
FIG. 10 shows a cross-sectional view of a cylindrical flow control wall 43 taken through the line 10—10 of FIG. 9.

FIG. 9 shows another housing 42 of the invention which is identical in structure and shape to the hollow cylindrical housing 22 as described in the description of the preferred embodiment and shown in FIG. 1 with the exception of its hollow cylindrical flow control wall 43. This housing 42 does not have the bottom wall 33 and the curved surfaces 36 as described in the description of the preferred embodiment and shown in FIG. 1. The hollow cylindrical flow control wall 43 is constructed by part of the housing wall, built around the outer perimeter of the cylindrical flow channel 27, elongated downward to the predetermined length as mentioned in the description of the preferred embodiment, and extended inward to form a bottom wall 45 of the hollow cylindrical flow control wall. All six vertical dividing walls 29 extend downward to the bottom wall 45. And all outer vertical edges of the six vertical diving walls 29 are extending outward to the inside surface of the hollow cylindrical flow control wall as shown clearly in FIG. 10. The hollow cylindrical flow control wall has a plurality of openings 44 which consist of inlets and outlets for allowing a predetermined flow of water in and out of its housing. The hollow cylindrical flow control wall has an outside diameter smaller than the minor diameter of the external threads of the inlet port 25. The inlets of the plurality of openings 44 have a total inlet area equal to a predetermined percent of a cross-sectional flow area of the horizontal channel of the Tee pipe fitting 31. The outlets of the plurality of openings 44 have a total outlet area equal to a predetermined percent of the cross-sectional flow area of the horizontal channel of the Tee pipe fitting 31.

The invention and its attendant advantages will be understood from the foregoing description and it will be apparent that various changes can be made in the form and construction of the invention without departing from the spirit and scope thereof or sacrificing its material advantages. I do not wish to be restricted to the specific forms shown or uses mentioned, except as defined in the accompanying claim.

I claim:

1. An applicator for allowing a predetermined portion of a fluid flow in a Tee pipe fitting of a fluid system into said applicator for dissolving soluble substances and distributing mixtures formed inside said applicator into said fluid flow, comprising of a cap and a hollow elongated housing, said cap having internal threads at its open end, said hollow elongated housing comprising of an enlarged chamber having a narrowed inlet port at its lower end and external threads at its upper end for engaging to said cap, said narrowed inlet port comprising of a flow channel extending to said enlarged chamber, external threads connecting to said Tee pipe fitting, and vertical walls dividing said flow channel into separate flow passages, said separate flow passages comprising of vertical inlets and outlets constructed by said vertical dividing walls extending outside said flow channel at a predetermined length, said vertical inlets and outlets having a common bottom wall constructed at the lower end of said vertical dividing walls, said common bottom wall having a size smaller than the size of said external threads of said narrowed inlet port, said vertical inlets having a total vertical flow area equal to a predetermined percent of a cross-sectional flow area of the horizontal channel of said Tee pipe fitting, said vertical outlets having a total vertical flow area equal to a predetermined percent of the cross-sectional flow area of the horizontal channel of said Tee pipe fitting.

2. An applicator as defined in claim 1 wherein said hollow elongated housing and said flow channel are generally cylindrical in shape, said separate flow passages has screen filters for preventing said soluble substances to clog sprinkler nozzles of said fluid system.

3. An applicator as defined in claim 1 wherein some of said separate flow passages are covered completely by surfaces.

4. An applicator as defined in claim 1 wherein a screen filter wall is constructed around the inner perimeter of said flow channel of said narrowed inlet port, elongated within said enlarged chamber, and extended inward to form a top wall of said screen filter, said vertical dividing walls are extending upward to said top wall and extending outward to the inner surface of said elongated screen filter.

5. An applicator for allowing a predetermined portion of a fluid flow in a Tee pipe fitting of a fluid system into said applicator for dissolving soluble substances and distributing mixtures formed inside said applicator into said fluid flow, comprising of a cap and a hollow elongated housing, said cap having internal threads at its open end, said hollow elongated housing comprising of an enlarged chamber having a narrowed inlet port at its lower end and external threads at its upper end for engaging to said cap, said narrowed inlet port comprising of a flow channel extending to said enlarged chamber, external threads connecting to said Tee pipe fitting, a fluid flow control wall constructed around the outer perimeter of said flow channel and elongated downward to a predetermined length and extended inward to form a bottom wall, and vertical walls dividing said flow channel into separate flow passages, said vertical dividing walls extending downward to said bottom wall of said elongated fluid flow control wall and extending outward to the inner surface of said elongated fluid flow control wall, said elongated fluid flow control wall having a size smaller than the size of said external threads of said narrowed inlet port and having a plurality of openings, said plurality of openings consisting of inlets and outlets for allowing said fluid in and out of said hollow elongated housing, said inlets having a total inlet area equal to a predetermined percent of a cross-sectional flow area of the horizontal channel of said Tee pipe fitting, said outlets having a total outlet area equal to a predetermined percent of the cross-sectional flow area of the horizontal channel of said Tee pipe fitting.

6. An applicator as defined in claim 5 wherein said plurality of openings has sizes smaller than sizes of sprinkler nozzles of said fluid system.

7. An applicator as defined in claim 5 wherein said hollow elongated housing and said flow channel and said elongated fluid flow control wall are generally cylindrical in shape.

* * * * *